Aug. 7, 1962     C. C. CUTLER     3,048,350

STABILIZATION OF EARTH SATELLITE REPEATERS

Filed July 27, 1959

PARTIALLY FILLED WITH LIQUID

INVENTOR
C. C. CUTLER
BY
ATTORNEY

United States Patent Office 3,048,350
Patented Aug. 7, 1962

3,048,350
STABILIZATION OF EARTH SATELLITE REPEATERS
Cassius C. Cutler, Gillette, N.J., assignor to Bell Telephone Laboratories, Incorporated, New York, N.Y., a corporation of New York
Filed July 27, 1959, Ser. No. 829,817
9 Claims. (Cl. 244—1)

This invention relates to earth satellites and more particularly to arrangements for controlling the orientation of earth satellites to be used in space as the repeaters of a radio communication system.

It has been proposed through the use of space satellite repeaters to provide radio communication systems operable at microwave frequencies and usable over distances far exceeding the usual line-of-sight limitation. One or more such repeaters may be used to form line-of-sight links between terminal stations located on earth or even on other planets. One of the problems involved in the use of such earth satellite repeaters, whether they are passive repeaters which serve merely to reflect an incoming radio wave and redirect it in a predetermined direction, or so-called active repeaters which receive an incoming radio wave, amplify it, and reradiate it in a predetermined direction, is that involved in maintaining the spatial orientation of the antenna or reflector elements.

One proposal for maintaining the orientation of a repeater-borne antenna involves launching the repeater as a whole with an initial spin about the axis of greatest moment of inertia and with an initial orientation such that this axis is normal to the plane of the desired satellite orbit. A satellite body so launched will maintain the initial orientation, providing that damping influences or other perturbations of the spin axis caused by inaccuracies in the launching do not cause the spin to degrade to such an extent that the gyroscopic action of the spinning body is lost. Obviously, antennas or reflectors mounted at the ends of the axis of greatest moment of inertia will maintain a fixed spatial orientation so long as the spin of the body continues about this axis.

Influences which may cause loss of such spin orientation include the effect of damping currents set up by the earth's magnetic field in current loops in the satellite, the planes of which intersect the desired spin axis. Currents flowing in such loops will cause torques about this spin axis which may add up to degrade the rotation of the body about this axis. Since it is impossible to construct either an antenna or a reflector which is not conducting and which does not, therefore, permit the flow of such damping currents, ultimate damping out of an initial spin is almost inevitable. Further, it is possible that the impact of micrometeorites on the spinning satellite will also tend to degrade the initial spin. In addition to the above effects, any error in the launching of the satellite which produces an initial spin about any axis other than the axis of greatest moment of inertia will tend to cause precession of the last-mentioned axis and consequent loss of the desired orientation.

It is accordingly the object of the present invention to improve spin-oriented space satellites by reducing their susceptibility to the damping effects of eddy currents and other influences tending to degrade the spin of the satellite required to maintain a predetermined spatial orientation thereof.

In view of the above objects, there is provided in accordance with the invention, a space satellite adapted to be launched with an initial spin about the axis of greatest moment of inertia and with this axis normal to the plane of a desired orbit. Decay of the initial spin and subsequent loss of the desired orientation is prevented by means in the satellite for generating a magnetic moment rotating about the spin axis in a plane normal thereto with an angular velocity approximating that desired for the satellite. In addition, means are provided for producing a damping force so directed as to resist motion of the satellite about any axis other than the desired spin axis.

The above and other features of the invention will be described in the following specification taken in connection with the drawing in which.

Figure 1:
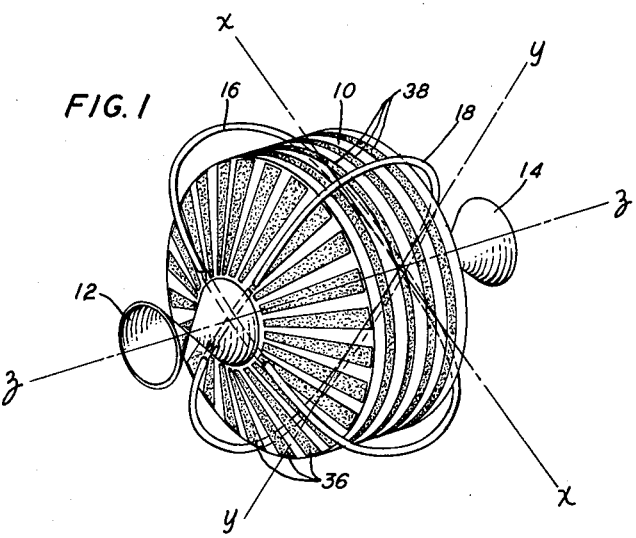
FIG. 1 is a perspective view of a space satellite arranged to prevent decay of the stabilizing spin with which it is launched.

In accordance with the invention, spin stabilization of an earth satellite to be used for a communication repeater is maintained by use of the earth's magnetic field. This field supplies an appropriate reference and also acts as a source of restoring torque such that the spin of an appropriately oriented satellite may be either maintained or accelerated. To this end, the satellite is equipped with means for producing therein a magnetic moment which rotates about the desired spin axis of the satellite; in this case the axis of greatest moment of inertia; and in a plane normal to this spin axis with an angular velocity closely approximating that required for stabilization of the satellite in space.

The action of the magnetic moment provided in the satellite, as outlined above, may be most easily understood in connection with the so-called polar orbit in which the satellite is launched to travel in an orbit passing over the poles of the earth. It is well known that the earth's magnetic field may be considered equivalent to that produced by a single magnetic dipole located at the center of the earth and extending approximately along the polar axis of the earth. Such a dipole produces a field, the lines of force of which may be visualized as leaving the surface of the earth at one pole at a direction which is essentially vertical at that point and extending around the surface of the earth to re-enter, again vertically, at the other pole. At the approximate location of the equator, these lines are parallel to the surface of the earth.

From the above consideration of the nature of the earth's magnetic field, it will be seen that as a satellite travels about the earth in a polar orbit, it will encounter a magnetic vector representing this field, which varies only slightly in magnitude but which rotates at twice the angular velocity of the satellite in orbit. In addition, this vector is always in or nearly in the plane of the orbit, the lack of correspondence of the plane including the vector and that of the orbit being determined by accuracy of launching, precession of the orbit with time, and the discrepancy between the location of the geographical and magnetic poles of the earth.

It can be seen, then, that if a satellite launched with an initial spin about the axis normal to the plane of this orbit is appropriately magnetized, it will seek the field direction which, as explained above, is just that effect required to maintain the axis of initial rotation normal to the plane of the orbit. In the absence of any other forces acting on the satellite, this effect would eventually produce an angular rotation about this axis very nearly equal to twice the angular rotation of the satellite in orbit. Further, it may be seen that if the satellite is provided with a magnetic moment rotating with respect to the satellite about the axis of initial spin and in the plane perpendicular to this axis, a resultant torque may be produced about this axis whenever this moment is normal to the direction of the earth's field and which will fall to zero whenever the moment is parallel to the earth's magnetic field. According to the invention, such a magnetic moment is produced in the satellite and is caused to revolve about the desired spin axis with an angular velocity nearly equal to that desired for stabilization of the satellite in space. Since the earth's field as experienced by the satellite reverses twice for each complete traversal of the orbit by the satellite, the angular velocity of the moment to be produced differs slightly from the desired angular velocity of the satellite. As the magnetic moment rotates with respect to the satellite, a resultant torque will tend to accelerate the satellite to such an angular velocity that the moment will be nearly stationary with respect to an external inertial frame of reference. When this occurs, the accelerating torque disappears and will reappear only when the angular velocity of the satellite decreases sufficiently to require a further torque to restore the equilibrium condition.

As has been suggested above, magnetization of the satellite might serve to produce a correcting torque. However, and in accordance with the invention, the satellite is provided with means for generating a rotating magnetic moment of just the characteristics required to accelerate the satellite to a predetermined angular velocity. This is accomplished by the provision of one or more current loops located in planes which include the desired spin axis of the satellite and which are excited with alternating current, the frequency of which is related to the desired angular velocity. Such an arrangement is shown in FIG. 1 of the drawing.

The satellite of FIG. 1 includes a generally cylindrical body 10 having frusto-conical ends and is arranged to provide the greatest moment of inertia about the axis designated z. If such a satellite is launched with an initial spin about the z axis and with this axis normal to the desired orbital plane, the spatial orientation of the z axis will be maintained. Accordingly, antennas, here shown as biconical antennas 12 and 14, may be mounted on the ends of the satellite body and will be maintained with a fixed spatial orientation as the satellite travels in orbit. It will be understood, of course, that reflectors, dipole antennas or combinations thereof, as well as any other desired form of antenna, may be mounted in corresponding locations and maintained in fixed orientation by the spin of the satellite.

Figure 3:
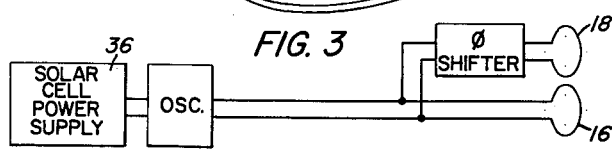
FIG. 3 is a block diagram of the satellite of FIG. 1 illustrating the electrical circuit of the stabilization system.

Satellite 10 is provided with a magnetic moment through the use of orthogonal current-carrying loops 16 and 18 which intersect on the spin axis of the satellite. If a three-axis orthogonal reference system is constructed having x, y, and z axes, as shown in the drawing, current loop 16 may be considered as mounted in the y—z plane and current loop 18 as mounted in the x—z plane. The product of the number of turns of wire in coils 16 and 18 multiplied by their respective areas is arranged to be the same for the two coils. If equal alternating currents of a frequency $\omega$ are supplied to coils 16 and 18 and are adjusted to be in quadrature, the resulting magnetic moment will be in a plane normal to the z axis, that is, in the x—y plane and will rotate with an angular velocity $\omega$. Such currents may conveniently be produced by an oscillator mounted within the satellite and providing two quadrature outputs. Such an oscillator may be a simple transistor oscillator which may, as will appear hereinafter, be operated at audio frequencies and may be powered by solar batteries or any other suitable source, as indicated in FIG. 3. The powers required to produce a suitable angular velocity of the satellite are not large and may easily be supplied by a very simple oscillator.

If the currents $I_1$ and $I_2$ applied to coils 16 and 18 are respectively $$I_1 = I_0 \sin \omega t \qquad (1)$$

$$I_2 = I_0 \cos \omega t \qquad (2)$$

the magnetic moment M of the satellite may be written in the x—y—z coordinate system as having the following components:

$$M_x = I_0 A \cos \omega t \qquad (3)$$
$$M_y = I_0 A \sin \omega t \qquad (4)$$

where A represents the area of the coil. If, as required, the satellite is rotating initially about the z axis, the net magnetic moment will rotate about this axis in the x—y plane but will appear to be stationary with respect to an inertial frame of reference if the satellite rotates at an angular velocity $\omega$ equal to the angular frequency which appears in Equations 1 through 4. If the satellite is so oriented that the earth's field B is totally in the x—y plane, the magnetic torque may be written.

$$N_z = M_x B_y - M_y B_x \qquad (5)$$

where $B_x$ and $B_y$ are the components of the earth's field along the x and y axes, respectively. This torque is maximum when the magnetic moment and the earth's field are at right angles and zero when they are parallel.

From the above, it will be seen that a torque acting in a direction to accelerate the satellite about the spin axis will exist so long as the angular velocity of the satellite is less than the chosen frequency of the exciting currents, and that when these two angular quantities are the same, the torque will disappear when the moment of the satellite and the earth's field become and remain parallel.

Figure 2:
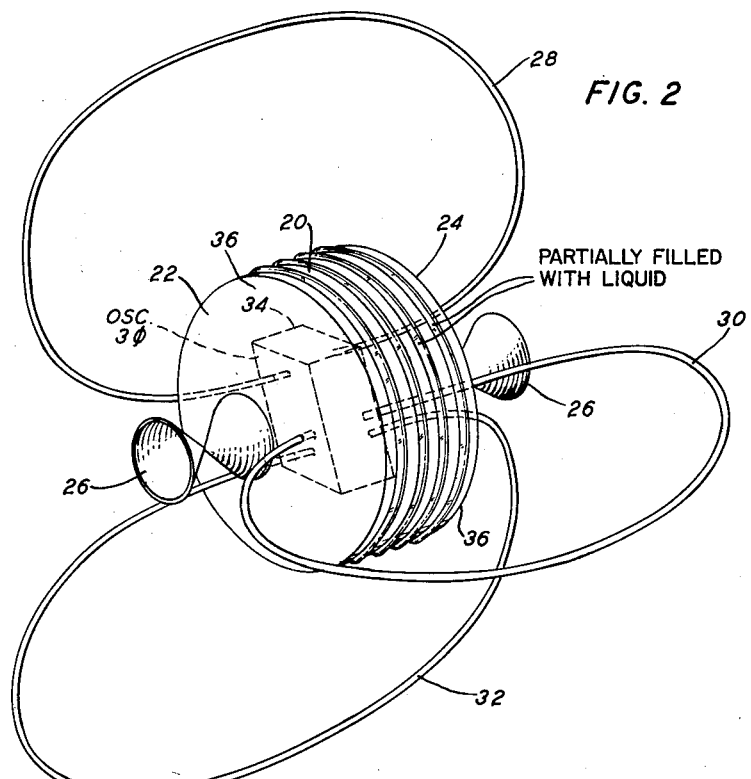
FIG. 2 is a perspective view of another arrangement according to the invention for maintaining the spin stabilization of a space satellite.

An alternative arrangement in accordance with the invention is illustrated in FIG. 2 of the drawing. Here, the magnetic moment required to maintain or accelerate the initial spin of the satellite is provided by three current-carrying loops rather than the two illustrated in FIG. 1. In addition, these loops are arranged somewhat differently from those shown in FIG. 1. In FIG. 1, current-carrying loops 16 and 18 are shown simply as mounted on and surrounding the body of the satellite. In the arrangement of FIG. 2, the body of the satellite may be generally similar to that of FIG. 1 and comprises a cylindrical portion 20 having frusto-conical end portions 22 and 24 and adapted to rotate about the axis of greatest moment of inertia. Antennas or reflectors 26 may be provided as in the satellite of FIG. 1. Three current loops 28, 30, and 32 are provided and are shown as oriented at intervals of 120 degrees about the periphery of cylinder 20. As in the case of the current loops of FIG. 1, these loops are in planes which intersect on the spin axis. The loops 28, 30, and 32 of FIG. 2, however, have areas which are greater than those of FIG. 1 and these loops may consist, for example, of single turns of wire carried in a collapsed state on the satellite until the launching thereof in orbit with an initial spin. The wire loops are then released and, under the action of the centrifugal force produced by the satellite spin, are caused to assume the approximate shape and location shown in FIG. 2. Because of the greatly increased area of these current loops, either the number of turns of wire therein or the exciting currents may be reduced. A three-phase oscillator shown at 34 may be powered by solar batteries 36 mounted on the surface of the frusto-conical ends of the satellite body and provides currents of the desired angular frequency (corresponding to the desired angular velocity of the satellite) for the three loops. These currents are, of course, spaced 120 degrees, as are the loops, and act together, as did the two quadrature currents of FIG. 1, to produce a desired magnetic moment in the satellite.

It will be obvious from the above that any desired number of driven current loops may be employed providing that appropriately phased currents are applied thereto. Although the arrangements described will serve to maintain the angular rotation of the satellite about the desired axis, perturbing forces of one kind or another may act on the satellite in such directions as to tend to rotate the spin axis and to cause precession of the satellite. Such forces may, as has been suggested above, be due to micrometeorite collisions, inaccuracies in initial spin or initial orientation of the satellite, or to the presence of unwanted eddy currents. According to the invention, such disturbing influences are minimized by causing appropriate damping of angular rotations of the satellite about any axis other than the desired spin axis. As shown in FIG. 1, for example, this is accomplished by the provision of a plurality of conducting bands 38 encircling the body of the satellite in planes normal to the desired spin axis. These bands form closed current loops in which eddy currents are induced by the earth's magnetic field. The resultant magnetic moments are in a direction appropriate to damp out rotations of the satellite about any axis other than the desired spin axis. Alternatively, such damping may be produced by an appropriately oriented closed tube partially filled with liquid mounted within the body of the satellite in a plane intersecting the spin axis and arranged to damp out precession of this axis by flow within the tube. For example, the bands shown encircling the body of the satellite in FIG. 2 and corresponding to the conducting bands 38 of FIG. 1 may be hollow tubes partially filled with a liquid.

What is claimed is:

1. In a space satellite to be launched with an initial spin about the axis of greatest moment of inertia and with said axis normal to the plane of a desired orbit, means for maintaining the spin despite damping influences, comprising means producing a magnetic moment in the satellite rotating about the spin axis thereof and in a plane normal to said spin axis with an angular velocity approximately equal to the desired velocity of rotation of the satellite about the spin axis, and means for producing a damping force tending to resist motion of the satellite about any axis other than said spin axis.

2. In a space satellite to be launched with an initial spin about the axis of greatest moment of inertia and with said axis normal to the plane of a desired orbit, means for maintaining the spin despite damping influences, comprising means for magnetizing said satellite to produce a magnetic moment rotating about the spin axis in a plane perpendicular thereto with an angular velocity equal to the desired angular velocity of the satellite about said spin axis, and means for producing a damping force tending to resist motion of the satellite about any axis other than said spin axis.

3. In a space satellite to be launched with an initial spin about the axis of greatest moment of intertia and with said axis normal to the plane of a desired orbit, means for maintaining the spin despite damping influences, comprising at least one current-carrying loop mounted on the body of the satellite and in a plane including said spin axis, means for generating a current for exciting said loop, and means applying said current to said loop to produce a torque about the spin axis.

4. In a space satellite to be launched with an initial spin about the axis of greatest moment of inertia and with said axis normal to the plane of a desired orbit, means for maintaining the spin despite damping influences, comprising a pair of orthogonal current-carrying loops mounted on the satellite in planes which intersect along the spin axis thereof, and means for feeding alternating currents of angular frequencies equal to a desired angular velocity of said satellite about the spin axis and occurring in quadrature.

5. In a space satellite to be launched with an initial spin about the axis of greatest moment of inertia and with said axis normal to the plane of a desired orbit, means for maintaining the spin despite damping influences, comprising a plurality of current-carrying loops mounted on the satellite and located in planes intersecting along the desired spin axis, and means for exciting said current loops with multiphase current, the relative phases of the current in said loops corresponding electrically to angular displacements of the planes containing the respective ones of said loops.

6. In a space satellite to be launched with an initial spin about the axis of greatest moment of inertia and with said axis normal to the plane of a desired orbit, means for maintaining the spin despite damping influences, comprising a plurality of current-carrying loops mounted on the satellite and located in planes intersecting along the desired spin axis, means for exciting said current loops with multiphase currents, the currents in said loops being displaced electrically by the same angles as the planes containing the respective ones of said loops, and means for producing a damping force tending to resist motion of the satellite about any axis other than said spin axis.

7. In a space satellite to be launched with an initial spin about the axis of greatest moment of inertia and with said axis normal to the plane of a desired orbit, means for maintaining the spin despite damping influences, comprising a plurality of current-carrying loops mounted on the satellite and located in planes intersecting along the desired spin axis, means for exciting said current loops with multiphase currents, the currents in said loops being displaced electrically by the same angles as the planes containing the respective ones of said loops, and at least one current-carrying loop mounted on the satellite in a plane intersecting the desired spin axis and arranged to couple with the earth's magnetic field to produce eddy currents tending to damp rotation of the satellite about axes other than said spin axis.

8. In a space satellite to be launched with an initial spin about the axis of greatest moment of inertia and with said axis normal to the plane of a desired orbit, means for maintaining the spin despite damping influences, comprising a plurality of current-carrying loops mounted on the satellite and located in planes intersecting along the desired spin axis, means for exciting said current loops with multiphase currents, the currents in said loops being spaced electrically by the same angles as the planes containing the respective ones of said loops, and a tube forming a closed path mounted within the satellite in a plane intersecting said spin axis, said tube being partially filled with liquid to produce a damping force tending to minimize rotations of the satellite about axes other than said spin axis.

9. In a space satellite to be launched with an initial spin about the axis of greatest moment of inertia and with said axis normal to the plane of a desired orbit, means for maintaining the spin despite damping influences, comprising a plurality of single driven wire loops carried by said satellite for ejection therefrom when the satellite is launched with an initial spin in orbit and arranged to be held by the centrifugal force thereafter in planes intersecting the spin axis of said satellite, and means for applying currents to said single driven loops, the phases of which differ in correspondence with the angular separation of said loops to produce a magnetic moment rotating with the desired angular velocity for the satellite about said spin axis in a plane normal to said spin axis.

References Cited in the file of this patent
UNITED STATES PATENTS

| | | |
|---|---|---|
| 1,019,544 | South | Mar. 5, 1912 |
| 2,856,142 | Haviland | Oct. 14, 1958 |